(12) United States Patent
Wang

(10) Patent No.: US 10,359,562 B2
(45) Date of Patent: Jul. 23, 2019

(54) LIGHT GUIDE PLATE, BACKLIGHT SOURCE AND DISPLAY DEVICE

(71) Applicants: BOE TECHNOLOGY GROUP CO., LTD., Beijing (CN); BOE OPTICAL SCIENCE AND TECHNOLOGY CO., LTD., Jiangsu (CN)

(72) Inventor: Tao Wang, Beijing (CN)

(73) Assignees: BOE TECHOLOGY GROUP CO., LTD., Beijing (CN); BOE OPTICAL SCIENCE AND TECHNOLOGY CO., LTD., Suzhou, Jiangsu (CN)

( * ) Notice: Subject to any disclaimer, the term of this patent is extended or adjusted under 35 U.S.C. 154(b) by 0 days.

(21) Appl. No.: 15/329,077

(22) PCT Filed: Jul. 8, 2016

(86) PCT No.: PCT/CN2016/089423
§ 371 (c)(1),
(2) Date: Jan. 25, 2017

(87) PCT Pub. No.: WO2017/121081
PCT Pub. Date: Jul. 20, 2017

(65) Prior Publication Data
US 2018/0306969 A1    Oct. 25, 2018

(30) Foreign Application Priority Data

Jan. 15, 2016  (CN) .......................... 2016 1 0028621

(51) Int. Cl.
*G09F 13/04* (2006.01)
*F21V 8/00* (2006.01)
(Continued)

(52) U.S. Cl.
CPC ............ *G02B 6/0088* (2013.01); *F21V 17/16* (2013.01); *G02B 6/00* (2013.01); *G02F 1/133308* (2013.01); *G02F 1/133602* (2013.01)

(58) Field of Classification Search
CPC ... G02B 6/0088; G02B 6/0093; G02B 6/0095
(Continued)

(56) References Cited

U.S. PATENT DOCUMENTS

2007/0002591 A1* 1/2007 Chang ................. G02B 6/0088
                                                              362/633
2007/0279728 A1* 12/2007 Murakata ............ G02B 6/0088
                                                              359/245

(Continued)

FOREIGN PATENT DOCUMENTS

| CN | 101943375 A | 1/2011 |
|----|-------------|--------|
| CN | 102141222 A | 8/2011 |

(Continued)

OTHER PUBLICATIONS

First Office Action for Chinese Application No. 201610028621.X, dated Dec. 29, 2017, 6 Pages.

(Continued)

*Primary Examiner* — Matthew J. Peerce
(74) *Attorney, Agent, or Firm* — Brooks Kushman P.C.

(57) ABSTRACT

A light guide plate is provided, including a body. A protruding portion that protrudes outwardly is provided on a lateral surface of the body, and the body is further provided with a slot. The slot is capable of enabling the protruding portion to be deformed elastically to position and fix the body. A backlight source and a display device are further provided.

13 Claims, 5 Drawing Sheets

(51) Int. Cl.
*F21V 17/16* (2006.01)
*G02B 6/00* (2006.01)
*G02F 1/1333* (2006.01)
*G02F 1/1335* (2006.01)

(58) Field of Classification Search
USPC .................................................. 362/633, 607
See application file for complete search history.

(56) References Cited

U.S. PATENT DOCUMENTS

| | | | | |
|---|---|---|---|---|
| 2008/0291697 | A1* | 11/2008 | Sun | ...................... G02B 6/0088 362/628 |
| 2010/0296021 | A1 | 11/2010 | Jung et al. | |
| 2012/0236228 | A1 | 9/2012 | Tang | |
| 2014/0043856 | A1* | 2/2014 | Thompson | .............. F21V 3/049 362/613 |
| 2015/0042899 | A1 | 2/2015 | Tomomasa | |
| 2015/0219838 | A1* | 8/2015 | Jang | ..................... G02B 6/0088 349/65 |
| 2016/0282548 | A1 | 9/2016 | He | |

FOREIGN PATENT DOCUMENTS

| | | |
|---|---|---|
| CN | 102628570 A | 8/2012 |
| CN | 203131584 U | 8/2013 |
| CN | 103697414 A | 4/2014 |
| CN | 204153707 U | 2/2015 |
| CN | 204332261 U | 5/2015 |
| CN | 104696833 A | 6/2015 |
| CN | 104832842 A | 8/2015 |
| CN | 105467506 A | 4/2016 |
| JP | 2008032888 A | 2/2008 |
| WO | 2013129244 A1 | 9/2013 |

OTHER PUBLICATIONS

International Search Report and Written Opinion for Application No. PCT/CN2016/089423, dated Sep. 21, 2016, 10 Pages.

* cited by examiner

LIGHT GUIDE PLATE, BACKLIGHT
SOURCE AND DISPLAY DEVICE

CROSS-REFERENCE TO RELATED
APPLICATIONS

This application is the U.S. national phase of PCT Application No. PCT/CN2016/089423 filed on Jul. 8, 2016, which claims priority to Chinese Patent Application No. 201610028621.X filed on Jan. 15, 2016, the disclosures of which are incorporated in their entirety by reference herein.

TECHNICAL FIELD

The present disclosure relates to the field of manufacturing liquid crystal products, and in particular, to a light guide plate, a backlight source and a display device.

BACKGROUND

In related technology, the light guide plate can be fixed in the following two ways.

In a first way, the light guide plate is clamped to a backboard through a clamping member on the light guide plate and a clamping member of the backboard, which leads to simple assembly. However, the light guide plate may shake in the product, the structure is of low stability, and light spots may be easily generated due to friction.

In a second way, a buffer member is provided between the light guide plate and the backboard. In such way, the light guide plate may not shake and the product is of high quality. However, due to the additional buffer member, complex assembly and high labor and material costs are caused.

SUMMARY

In view of the above technical problems, the present disclosure provides a light guide plate, a backlight source and a display device, to improve stability of the light guide plate, simplify the assembly and reduce the costs.

In technical solution of the present disclosure, a light guide plate is provided. The light guide plate includes a body. A protruding portion that protrudes outwardly is provided on a lateral surface of the body, and the body is further provided with a slot enabling the protruding portion to be deformed elastically to position and fix the body.

Furthermore, a first protrusion that protrudes outwardly is provided on the lateral surface of the body, the protruding portion is provided on a lateral surface of the first protrusion, and the slot is provided in the first protrusion at a position corresponding to the protruding portion.

Furthermore, a length of the slot is larger than a length of the protruding portion.

Furthermore, a width of the slot is larger than an amount of deformation of the protruding portion in the case that the protruding portion is deformed.

Furthermore, a guiding mechanism is provided on the protruding portion, and the guiding mechanism is used to guide the protruding portion to move along a preset direction to position and fix the light guide plate.

Furthermore, the guiding mechanism is formed by an external lateral surface of the protruding portion, and the external lateral surface is a slope.

Furthermore, the guiding mechanism is formed by an external lateral surface of the protruding portion. The external lateral surface includes a connection surface that extends downwardly from a top surface of the body and a slope in connection with the connection surface.

Furthermore, the guiding mechanism is formed by an external lateral surface of the protruding portion, and the external lateral surface is a cambered surface.

Furthermore, the guiding mechanism is formed by an external lateral surface of the protruding portion. The external lateral surface includes a connection surface that extends downwardly from the top surface of the body and a cambered surface in connection with the connection surface.

Furthermore, the guiding mechanism is a second protrusion arranged on an external lateral surface of the protruding portion, and a transition surface between an external lateral surface and a bottom surface of the second protrusion is a slope or a cambered surface.

Furthermore, a height of the second protrusion is smaller than a height of the protruding portion.

Furthermore, the slot includes multiple parallel sub-slots.

A backlight source is provided in the present disclosure, which includes the above-described light guide plate.

Furthermore, the light guide plate is positioned and fixed through interference fit between the protruding portion of the light guide plate and a backboard of a display device, or through interference fit between the protruding portion of the light guide plate and a frame surrounding the backlight source.

A display device is further provided in the present disclosure, which includes a display panel, a backboard, a frame and the above-described backlight source. The backlight source is arranged in a space surrounded by the backboard and the frame.

Furthermore, the body is positioned and fixed through interference fit between the protruding portion on the body and the backboard.

Furthermore, the body is positioned and fixed through interference fit between the protruding portion on the body and the frame.

Beneficial effects of the present disclosure are given as follows. The light guide plate itself is provided with the protruding portion and the slot for positioning and fixing the light guide plate. Through positioning and fixing the light guide plate in this way, the light guide plate may not shake and may be fixed more stably, the generation of light spots in products due to friction caused by shaking of the light guide plate can be greatly alleviated, and the assembly is simple and manufacture cost is low. In addition, the protruding portion is provided with a guiding mechanism, which may guide the protruding portion to move along a preset direction to position and fix the light guide plate. The guiding mechanism may also facilitate assembly of the light guide plate.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort. The described drawings are not zoomed with respect to actual sizes and are merely for explaining the present disclosure.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
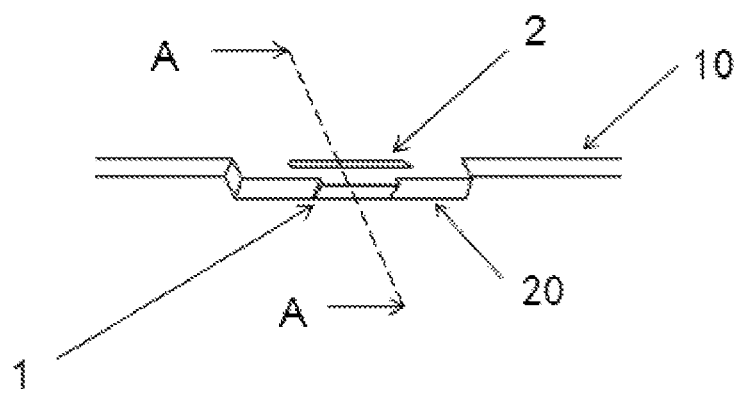
FIG. 1 is a schematic partial structural diagram of a light guide plate according to some embodiments of the present disclosure.
Figure 2:
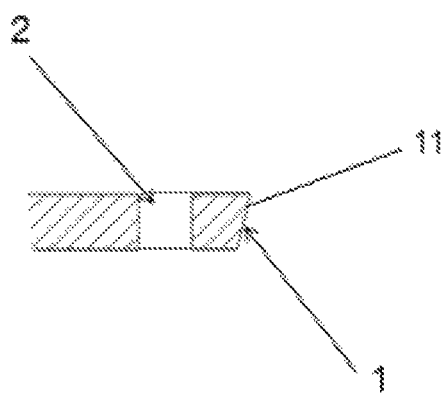
FIG. 2 is a sectional view taken along line A-A in FIG. 1.

A light guide plate is provided according to some embodiments of the present disclosure. As shown in FIG. 1 and FIG. 2, the light guide plate includes a body 10. A protruding portion 1 that protrudes outwardly is provided on a lateral surface of the body 10. The body 10 is further provided with a slot 2, with which the protruding portion 1 can be elastically deformed to position and fix the body 10.

The light guide plate itself is provided with the protruding portion 1 and the slot 2 for positioning and fixing the light guide plate, the protruding portion 1 and the slot 2 cooperate with each other, such that the light guide plate is positioned and fixed through elastic deformation of the protruding portion 1. Through positioning and fixing the light guide plate in such way, the light guide plate may not shake and can be fixed stably, the generation of light spots in products due to friction can be significantly alleviated, and the assembly is simple and manufacture cost is low since no connection member, e.g., clamping member, needs to be provided separately.

In order to prevent light guiding performance of the light guide plate from being adversely affected by a slot 2 provided on the light guide plate itself, according to some embodiments, a first protrusion 20 that protrudes outwardly is provided on the lateral surface of the body 10, the protruding portion 1 is provided on a lateral surface of the first protrusion 20, and the slot 2 is provided in the first protrusion 20 at a position corresponding to the protruding portion 1.

Optionally, to ensure sufficient elastic deformation of the protruding portion 1 to facilitate positioning and fixing the light guide plate, a length of the slot 2 is larger than a length of the protruding portion 1.

Further, to ensure that the slot 2 can accommodate the deformation of the protruding portion 1 to decrease deformation rigidity of the pressed protruding portion 1, a width of the slot 2 is larger than the amount of deformation of the protruding portion 1 in the case that the protruding portion 1 is deformed.

According to some embodiments, the quantity of the protruding portion 1 may be set based on actual needs and the quantity of the slot 2 may be set corresponding to the quantity of the protruding portion 1. Considering the amount of deformation to be accommodated, multiple parallel slots 2 can be provided corresponding to one protruding portion 1, such that the deformation of the protruding portion 1 is accommodated by the multiple slots 2, and thus the amount of deformation of the protruding portion 1 can be larger.

According to some embodiments, protruding portions 1 and slots 2 are provided on at least two adjacent lateral surfaces of the body 10.

Figure 11:
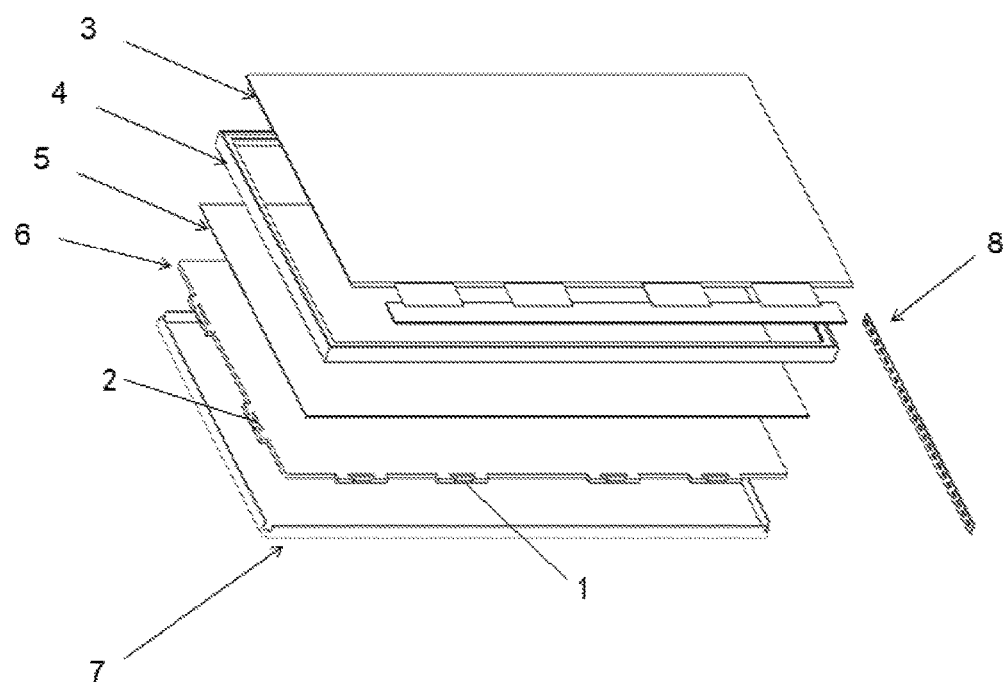
FIG. 11 is a schematic exploded diagram of a display device according to some embodiments of the present disclosure.

As shown in FIG. 11, according to some embodiments, two protruding portions 1 and two slots 2 matching the two protruding portions 1 respectively are provided on a first lateral surface of a body of a light guide plate 6. Four protruding portions 1 and slots 2 are provided on a second lateral surface of the body adjacent to the first lateral surface, where the quantity of the slots 2 corresponds to the quantity of the protruding portions 1.

Optionally, to facilitate assembly of the light guide plate, a guiding mechanism is provided on the protruding portion 1. The guiding mechanism is used to guide the protruding portion 1 to move along a preset direction to position and fix the light guide plate.

According to some embodiments, the guiding mechanism is formed by an external lateral surface 11 of the protruding portion 1, which is a slope as shown in FIG. 2.

As shown in FIG. 2, the slope and a top surface of the protruding portion 1 form an acute angle, that is, the slope tilts inwardly. As the light guide plate is positioned and fixed via the elastic deformation of the pressed protruding portion 1, the slope may guide the protruding portion 1 to move downwardly during assembling, and the light guide plate can be fixed easily since resistance is reduced.

Figure 3:
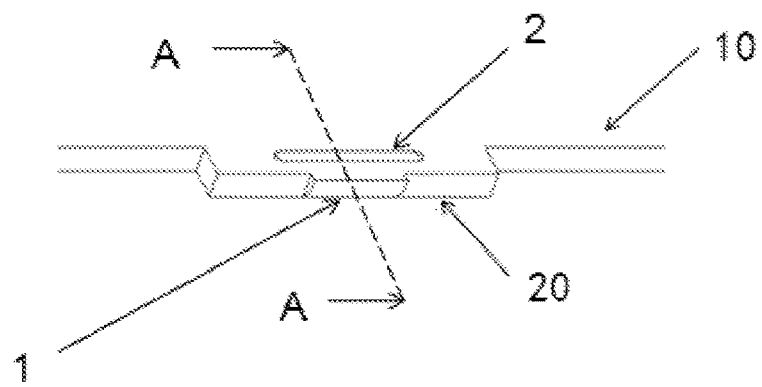
FIG. 3 is a schematic partial structural diagram of a light guide plate according to some embodiments of the present disclosure.
Figure 4:
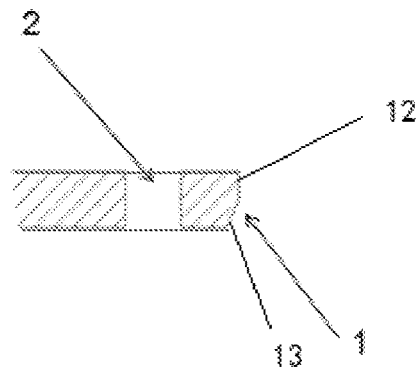
FIG. 4 is a sectional view taken along line A-A in FIG. 3.

Different from the embodiments based on FIG. 1 and FIG. 2, in some embodiments of the present disclosure, the guiding mechanism is formed by an external lateral surface of the protruding portion 1, and the external lateral surface includes a first connection surface 12 that extends downwardly from a top surface of the body 10 and a slope 13 in connection with the first connection surface 12, as shown in FIG. 3 and FIG. 4.

As shown in FIG. 4, the slope 13 tilts inwardly from a bottom of the first connection surface 12, such that resistance during assembling the light guide plate can be reduced. A tilting angle of the slope 13 can be set according to actual needs.

The first connection surface 12 is a plane, which improves stability of fixation of the light guide plate. Upon assembling the light guide plate, the slope 13 may guide the protruding portion 1 to move along a preset direction and the light guide plate is positioned and fixed via the elastic deformation of the pressed protruding portion 1. Through positioning and fixing the light guide plate in this way, the light guide plate may not shake, such that the light guide plate is fixed more stably. Here, the first connection surface 12 is in tight connection to a connection portion for fixing the light guide plate. The connection portion may be arranged on a backboard or a frame of a display device. A length of the first connection surface 12 may be set according to actual needs.

It should be noted that, the top surface of the body 10 is a surface of the body 10 close to a liquid crystal panel.

Figure 5:
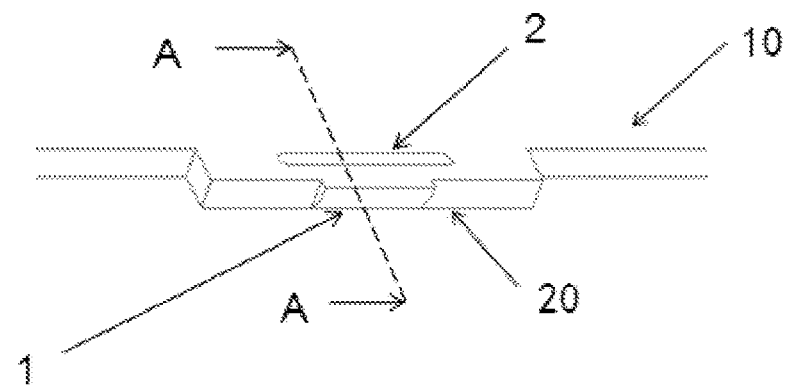
FIG. 5 is a schematic partial structural diagram of a light guide plate according to some embodiments of the present disclosure.
Figure 6:
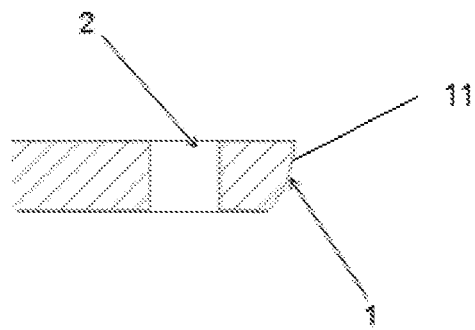
FIG. 6 is a sectional view taken along line A-A in FIG. 5.

Different from the embodiments based on FIG. 1 and FIG. 2, according to some embodiments of the present disclosure, the guiding mechanism is formed by an external lateral surface 11 of the protruding portion 1, which is a cambered surface as shown in FIG. 5 and FIG. 6.

As shown in FIG. 6, the external lateral surface 11 is a convex surface, that is, a surface curving outward. With a smooth cambered surface, the resistance during assembling the light guide plate is reduced and the protruding portion 1 can be guided to move along a preset direction, which facilitates positioning and fixing the light guide plate.

The light guide plate is positioned and fixed via elastic deformation of the pressed protruding portion 1; in this way, the light guide plate may not shake and is fixed more stably.

According to some embodiments, the cambered surface may be a part of a spherical surface or a part of a cylindrical surface.

Figure 7:
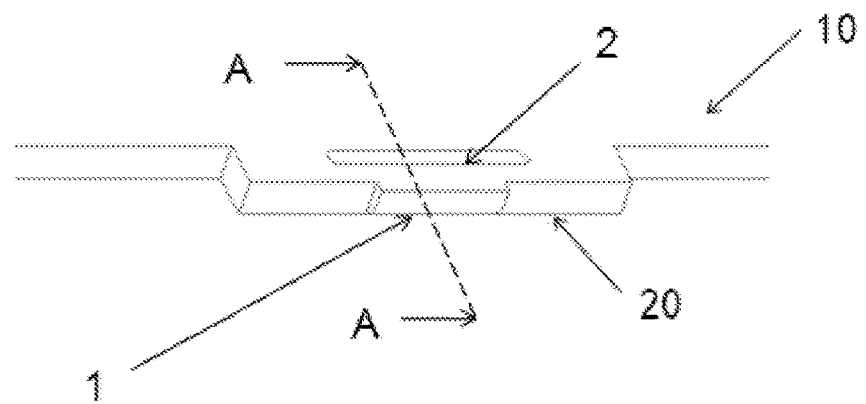
FIG. 7 is a schematic partial structural diagram of a light guide plate according to some embodiments of the present disclosure.
Figure 8:
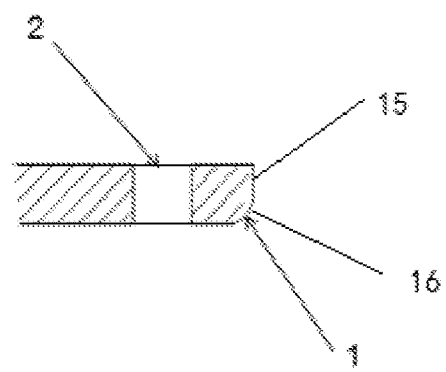
FIG. 8 is a sectional view taken along line A-A in FIG. 7.

Different from the embodiments based on FIG. 1 and FIG. 2, according to some embodiments of the present disclosure, the guiding mechanism is formed by an external lateral surface of the protruding portion 1, where the external lateral surface includes a second connection surface 15 that extends downwardly from the top surface of the body 10 and a cambered surface 16 in connection with the second connection surface 15, as shown in FIG. 7 and FIG. 8.

As shown in FIG. 8, the second connection surface 15 is a plane, which improves stability of fixation of the light guide plate. The cambered surface 16 is convex. With the smooth cambered surface 16, resistance to motion of the protruding portion 1 is reduced. Upon assembling the light guide plate, the cambered surface 16 guides the protruding portion 1 to move along a preset direction, and the light guide plate is positioned and fixed via elastic deformation of the pressed protruding portion 1. Through fixing the light guide plate in this way, the light guide plate may not shake and can be fixed more stably. Here, the second connection surface 15 is in tight connection with a connection portion for fixing the light guide plate, where the connection portion may be arranged on a backside or a frame of a display device. A length of the second connection surface 15 can be set according to actual needs.

Figure 9:
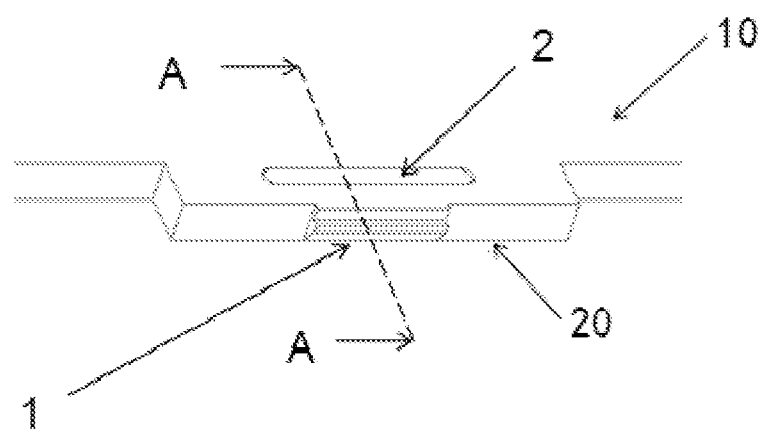
FIG. 9 is a schematic partial structural diagram of a light guide plate according to some embodiments of the present disclosure.

Different from the embodiments based on FIG. 1 and FIG. 2, according to some embodiments of the present disclosure, the guiding mechanism is a second protrusion 17 arranged on an external lateral surface of the protruding portion 1. A transition surface between an external lateral surface and a bottom surface of the second protrusion 17 is a slope or a cambered surface, as shown in FIG. 9 and FIG. 10.

Figure 10:
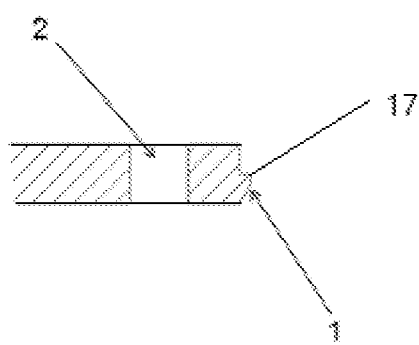
FIG. 10 is a sectional view taken along line A-A in FIG. 9.

As shown in FIG. 10, a lower part of the lateral surface of the protruding portion 1 curves outwardly to form the second protrusion 17. The transition surface between the external lateral surface and the bottom surface of the second protrusion 17 is a cambered surface. A height of the second protrusion 17 is smaller than a height of the protruding portion 1, and the second protrusion 17 is more easily to be deformed than the protruding portion 1. In addition, the cambered transition surface may have a guiding function and may facilitate the assembly of the light guide plate.

The light guide plate is positioned and fixed via the elastic deformation of the protruding portion 1. Through fixing the light guide plate in this way, the light guide plate may not shake and may be fixed more stably.

A backlight source is provided according to some embodiments of the present disclosure, including the above-described light guide plate. Partial structures of the light guide plate are shown in FIG. 1-FIG. 10. The light guide plate includes the body 10, the protruding portion 1 protruding outwardly is arranged on the lateral surface of the body 10, and the body 10 is further provided with the slot 2, with which the protruding portion 1 may deform elastically to position and fix the body 10.

The light guide plate itself is provided with the protruding portion 1 and the slot 2 for positioning and fixing the light guide plate. The protruding portion 1 and the slot cooperate such that the light guide plate can be positioned and fixed via elastic deformation of the protruding portion 1. Through fixing the light guide plate in this way, the light guide plate may not shake and may be fixed more stably, the generation of light spots in products due to friction can be significantly alleviated, and the assembly is simple and manufacture cost is low since no connection member, e.g., clamping member, needs to be provided separately.

FIG. 11 is a schematic exploded diagram of a display device including the above-described backlight source. During assembling, the light guide plate 6 is positioned and fixed through interference fit between the protruding portion 1 on the body and a backboard 7 of the display device, or through interference fit between the protruding portion 1 and a frame 4 surrounding the backlight source.

The protruding portion 1 is provided with a guiding mechanism, which may guide the protruding portion 1 to move along a preset direction to position and fix the light guide plate. The guiding mechanism may facilitate assembly of the light guide plate 6, and for detailed structure of the guiding mechanism, it may refer to the embodiments based on FIG. 1-FIG. 10.

A display device is provided according to some embodiments of the present disclosure, including a display panel 3, a backboard 7, a frame 4 and a backlight source arranged in a space surrounded by the backboard 7 and the frame 4. The backlight source includes a light guide plate 6, a light source 8 at a side of the light guide plate 6, and an optical film group 5 on the light guide plate 6. The light guide plate 6 includes a body 10. A protruding portion 1 protruding outwardly is arranged on a lateral surface of the body 10, and the body 10 is further provided with a slot 2 with which the protruding portion 1 can deform elastically to position and fix the body 10, as shown in FIG. 1-FIG. 11.

The light guide plate itself is provided with the protruding portion and the slot for positioning and fixing the light guide plate. The protruding portion and the slot cooperate such that the light guide plate can be positioned and fixed via elastic deformation of the protruding portion. Through fixing the light guide plate in this way, the light guide plate may not shake and may be fixed more stably, the generation of light spots in products due to friction can be significantly alleviated, and the assembly is simple and manufacture cost is low since no connection member, e.g., clamping member, needs to be provided separately. The protruding portion 1 is provided with a guiding mechanism, which may guide the protruding portion 1 to move along a preset direction to position and fix the light guide plate. The guiding mechanism may facilitate assembly of the light guide plate 6, and for detailed structure of the guiding mechanism, it may refer to the embodiments based on FIG. 1-FIG. 10.

The protruding portion 1 is provided with a guiding mechanism, which may guide the protruding portion 1 to move along a preset direction to position and fix the light guide plate, and may facilitate assembly of the light guide plate.

The body is positioned and fixed through interference fit between the protruding portion on the body and the backboard, or through interference fit between the protruding portion on the body and the frame.

In the embodiments of the present disclosure, the light guide plate itself is provided with the protruding portion 1 and the slot 2 for positioning and fixing the light guide plate. The protruding portion 1 and the slot 2 cooperate such that the light guide plate can be positioned and fixed via elastic deformation of the protruding portion 1. Through fixing the light guide plate in this way, the light guide plate may not shake and may be fixed more stably, the generation of light spots in products due to friction can be significantly alleviated, and the assembly is simple and manufacture cost is low since no connection member, e.g., clamping member, needs to be provided separately.

The protruding portion 1 is provided with a guiding mechanism, which may guide the protruding portion 1 to move along a preset direction to position and fix the light guide plate and may facilitate assembly of the light guide plate.

The above are merely the optional embodiments of the present disclosure. A person skilled in the art may make further modifications and improvements without departing from the principle/spirit of the present disclosure, and these modifications and improvements shall also fall within the scope of the present disclosure.

What is claimed is:

1. A light guide plate, comprising a body and a first protrusion, wherein
   the first protrusion is provided on a lateral surface of the body and protrudes outwardly;
   a protruding portion is provided on a lateral surface of the first protrusion and protrudes outwardly;
   a slot is provided in the first protrusion at a position corresponding to the protruding portion;
   the first protrusion and the protruding portion are deformable; and
   the slot is of a stripe shape and has a length larger than that of the protruding portion.

2. The light guide plate according to claim 1, wherein an external lateral surface of the protruding portion is a slope.

3. The light guide plate according to claim 1, wherein an external lateral surface of the protruding portion comprises a connection surface that extends downwardly from a top surface of the body and a slope in connection with the connection surface.

4. The light guide plate according to claim 1, wherein an external lateral surface of the protruding portion is a cambered surface.

5. The light guide plate according to claim 1, wherein an external lateral surface of the protruding portion comprises a connection surface that extends downwardly from a top surface of the body and a cambered surface in connection with the connection surface.

6. The light guide plate according to claim 1, wherein a second protrusion is arranged on an external lateral surface of the protruding portion, and a transition surface between an external lateral surface and a bottom surface of the second protrusion is a slope or a cambered surface.

7. The light guide plate according to claim 6, wherein a height of the second protrusion is smaller than a height of the protruding portion.

8. The light guide plate according to claim 1, wherein the slot comprises a plurality of parallel sub-slots.

9. A backlight source, comprising the light guide plate according to claim 1.

10. The backlight source according to claim 9, wherein the light guide plate is positioned and fixed through interference fit between the protruding portion of the light guide plate and a backboard of a display device, or through interference fit between the protruding portion of the light guide plate and a frame surrounding the backlight source.

11. A display device, comprising a display panel, a backboard, a frame and the backlight source according to claim 9, wherein the backlight source is arranged in a space surrounded by the backboard and the frame.

12. The display device according to claim 11, wherein the body is positioned and fixed through interference fit between the protruding portion on the body and the backboard.

13. The display device according to claim 11, wherein the body is positioned and fixed through interference fit between the protruding portion on the body and the frame.

* * * * *

UNITED STATES PATENT AND TRADEMARK OFFICE
CERTIFICATE OF CORRECTION

PATENT NO. : 10,359,562 B2  
APPLICATION NO. : 15/329077  
DATED : July 23, 2019  
INVENTOR(S) : Tao Wang Page 1 of 1

It is certified that error appears in the above-identified patent and that said Letters Patent is hereby corrected as shown below:

On the Title Page

Item (73), Delete:
"(73) Assignees: BOE TECHOLOGY GROUP CO., LTD., Beijing (CN); BOE OPTICAL SCIENCE AND TECHNOLOGY CO., LTD., Suzhou, Jiangsu (CN)"

And Insert:
--(73) Assignees: BOE TECHNOLOGY GROUP CO., LTD., Beijing (CN); BOE OPTICAL SCIENCE AND TECHNOLOGY CO., LTD., Suzhou, Jiangsu (CN)--

Signed and Sealed this  
Fifteenth Day of October, 2019

Andrei Iancu  
*Director of the United States Patent and Trademark Office*